(12) United States Patent
Choi (10) Patent No.: US 7,163,567 B2
(45) Date of Patent: Jan. 16, 2007

(54) AIR CLEANER

(75) Inventor: Ho Seon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 294 days.

(21) Appl. No.: 10/755,325

(22) Filed: Jan. 13, 2004

(65) Prior Publication Data

US 2005/0022673 A1 Feb. 3, 2005

(30) Foreign Application Priority Data

Jul. 28, 2003 (KR) .................. 10-2003-0051960

(51) Int. Cl.
*B01D 46/42* (2006.01)
(52) U.S. Cl. .................. 55/312; 55/419; 55/470; 55/472; 55/482; 55/486; 96/222
(58) Field of Classification Search .................. 55/309, 55/312, 419, 467, 470, 472, 482, 486; 96/222
See application file for complete search history.

(56) References Cited

U.S. PATENT DOCUMENTS 2,157,307 A * 5/1939 Savage .................. 96/379
4,272,261 A * 6/1981 Lynch et al. .................. 96/222

FOREIGN PATENT DOCUMENTS

JP 2002-66236 A 3/2002

* cited by examiner

*Primary Examiner*—Robert A. Hopkins
(74) *Attorney, Agent, or Firm*—Birch, Stewart, Kolasch and Birch, LLP (57) ABSTRACT

Air cleaner including a body forming an exterior, having an first inlet and a second inlet for drawing room air, and an outlet for discharging air having dust or odor removed therefrom, at least more than one dust collecting filters at the first inlet inside of the body, at least more than one deodorizing filters at the second inlet inside of the body, at least more than one discharge fan for providing a suction force so as to draw room air, pass the room air through the filters inside of the body, and discharge the room air through the outlet, and opening/closing means for opening/closing the inlets selectively, thereby operating the air cleaner proper to an environment of use.

23 Claims, 11 Drawing Sheets

AIR CLEANER

This application claims the benefit of the Korean Application No. P2003-0051960 filed on Jul. 28, 2003, which is hereby incorporated by reference.

BACKGROUND OF THE INVENTION

1. Field of the Invention

The present invention relates to air cleaners, and more particularly, to an air cleaner operative proper to a purpose of use or an environment.

2. Background of the Related Art

Figure 1:
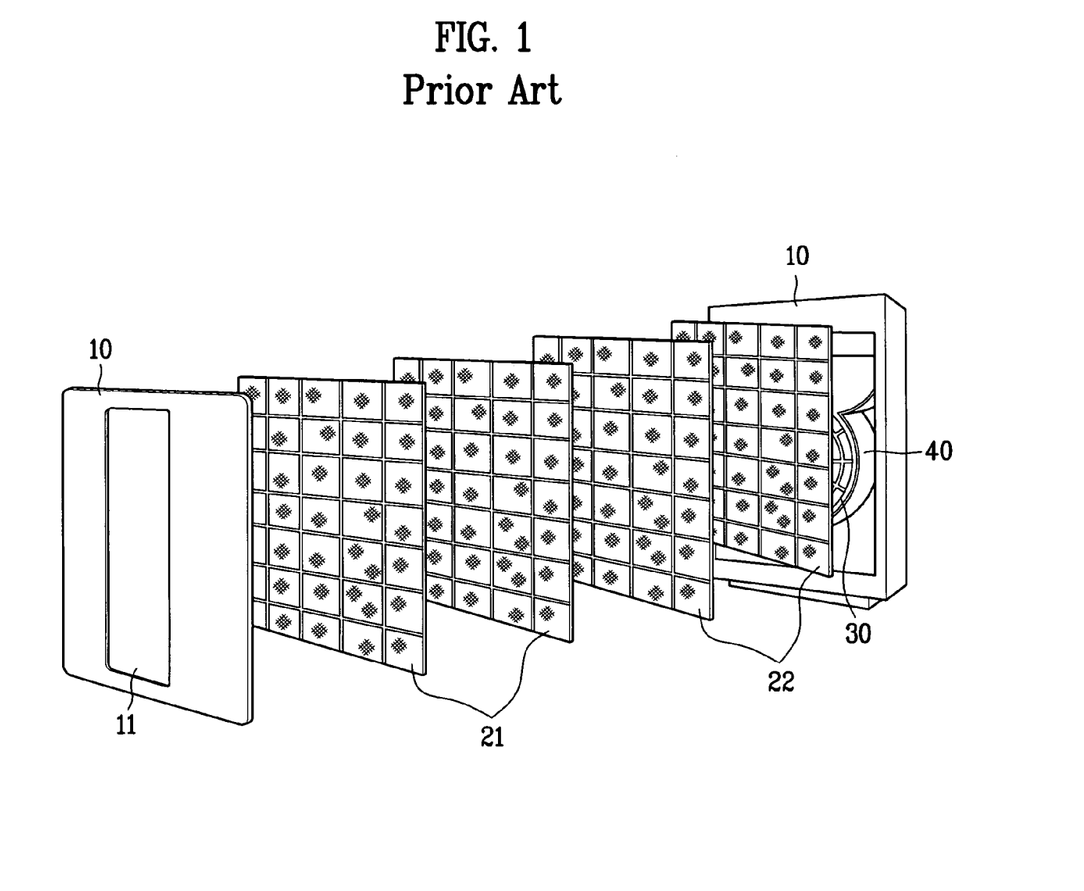
FIG. 1 illustrates a disassembled perspective view of a related art air cleaner, schematically.
Figure 2:
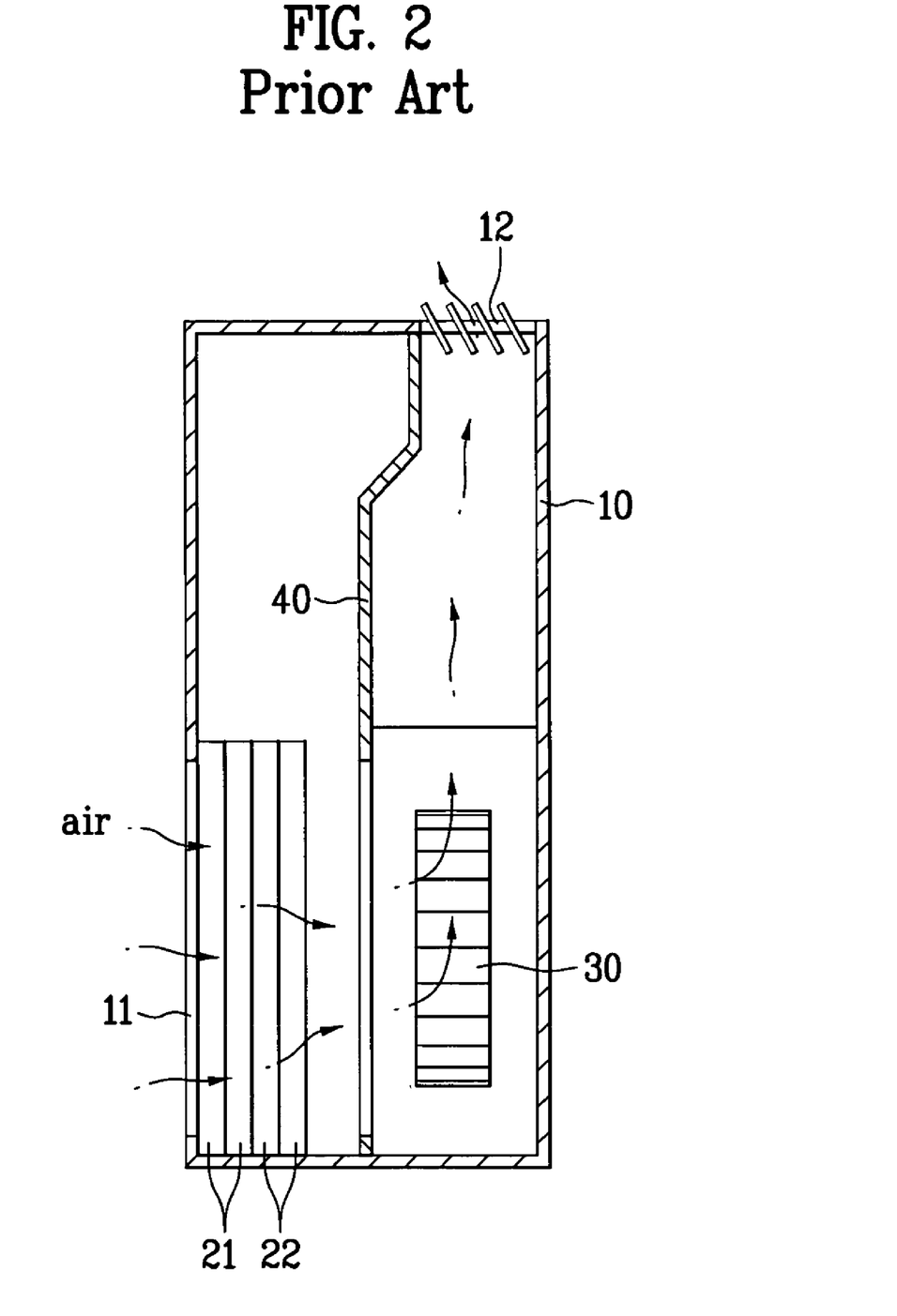
FIG. 2 illustrates a side sectional view of a related art air cleaner, schematically.

In general, the air cleaner provides a comfortable room environment by carrying out a deodorization function for removing various smells in the room, and a dust collecting function for removing dust from the room. FIGS. 1 and 2 illustrate related art air cleaners, schematically.

As shown, the related art air cleaner is provided with a body 10 forming an exterior, various of filters, discharge fan 30, and a flow guide 40.

The body 10 is provided with an air inlet 11 in a lower front part thereof for drawing room air, and an air outlet 12 in a rear upper part thereof for discharging cleaned air.

The various filters are a plurality of dust collecting filters 21 for removal of various dusts, and a plurality of deodorizing filters 22 for deodorizing various smells, mounted in succession in a part the air inlet 11 is formed.

The discharge fan 30, mounted in rear of the filters 21 and 22, discharges the air drawn through the air inlet 11, and passed through the filters 21 and 22 to an outside of the body 10.

The flow guide 40, formed in a rear part of the body 10, guides the air passed through the discharge fan 30 to the air outlet 12 in the body 10.

Accordingly, upon putting the air cleaner into operation, the discharge fan 30 is rotated, so that room air is drawn into the body 10 through the air inlet, and passed through the filters 21 and 22 for dust collecting and deodorizing.

In this instance, the dust collection is made as the air passes through the dust collecting filters 21, and the deodorizing is made as the air passes the deodorizing filter 22 in rear of the dust collecting filters 21.

Cleaning of the room air is made as the air dust collected and deodorized therefrom passes the discharge fan 30, is guided by the flow guide 40, and discharged into the room through the air outlet 12.

However, the related art air cleaner has the following different problems in a filter mounting structure.

First, because the related art air cleaner passes air through all the filters in succession regardless of purpose of use or site, a lifetime of the filters is reduced.

For an example, if the air cleaner is used in a purpose of deodorization in, such as a kitchen, when air containing smell compositions passes the dust collecting filters unnecessarily, the dust collecting filters is contaminated without functioning properly, to shorten a lifetime of the dust collecting filters.

On the other hand, if the air cleaner is used in a site with much dust for cleaning room air, it is not necessary to pass the air with dust through the deodorizing filters. Despite of this, since the air passes through the deodorizing filter, a lifetime of the deodorizing filters is shortened unnecessarily. Particularly, the deodorizing filter is in general an activated-carbon filter, accumulation of dust makes the deodorizing performance poor, to drop a user's reliability of the device.

Second, since the related art air cleaner requires air to pass the plurality of filters, which causes flow resistance at the filters, a load on a fan motor (not shown) for driving the discharge fan increases, to increase a power consumption.

SUMMARY OF THE INVENTION

Accordingly, the present invention is directed to an air cleaner that substantially obviates one or more of the problems due to limitations and disadvantages of the related art.

An object of the present invention is to provide an air cleaner, in which air passes only a filter required for purpose of use or environment of the air cleaner.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the air cleaner including a body forming an exterior, having an first inlet and a second inlet for drawing room air, and an outlet for discharging air having dust or odor removed therefrom, at least more than one dust collecting filters at the first inlet inside of the body, at least more than one deodorizing filters at the second inlet inside of the body, at least more than one discharge fan for providing a suction force so as to draw room air, pass the room air through the filters inside of the body, and discharge the room air through the outlet, and opening/closing means for opening/closing the inlets, selectively.

The inlets are formed in parallel in a front part of the body, and the discharge fan is a centrifugal fan.

The inlets are formed in opposite sides of the body, and the at least more that one discharge fan includes one pair of centrifugal fans arranged in parallel in a central part of the inlets, respectively.

The inlets are formed in the front part and a rear part of the body respectively, and the at least more than one discharge fan includes one pair of centrifugal fans arranged in parallel in a central part of the inlets, respectively.

The air cleaner further includes a baffle plate between the dust collecting filters and the deodorizing filters.

The opening/closing means includes a first door part for opening/closing the first inlet, a second door part for opening/closing the second inlet, and a first driving part and a second driving part for driving respective door parts.

The first driving part includes a first driving motor, and a first connection wire connected between the first driving motor and the first door part, and the second driving part includes a second driving motor, and a second connection wire connected between the second driving motor and the second door part.

The opening/closing means further includes a first guide rail and a second guide rail, and the first guide rail is bent along an edge of an inside of the body so as to guide the first door part to positions at which the first inlet is closed or opened, and the second guide rail is bent along an edge of an inside of the body so as to guide the second door part to positions at which the second inlet is closed or opened.

The guide rails guide tops or bottoms of the door parts respectively, and the guide rails guide tops and bottoms of the door parts, respectively.

The door parts are formed of materials, including a flexibly bendable material, and the door part includes a plurality of plates each having a small width, and a flexibly bendable bending part between the plates.

The opening/closing means includes a third door part movable to close at least any one of the inlets selectively, and a third driving part for moving the third door part in both directions.

The third driving part includes a third connection wire having one end connected to one side of the third door part, a third driving motor to be driven to wind or unwind the third connection wire, a fourth connection wire having one end connected to the other side of the third door part, and a fourth driving motor to be driven to wind or unwind the fourth connection wire.

The air cleaner further includes a baffle plate between the dust collecting filters and the deodorizing filters, and pins at both ends of the third door parts to be fastened to the baffle plate.

The third driving part includes a fifth connection wire having one end connected to one side of the third door part, a sixth connection wire having one end connected to the other side of the third connection part, and a fifth driving motor connected to the other ends of the fifth connection wire and the sixth connection wire to be driven to wind/unwind respective connection wires.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings FIGS. 3~15. In describing the embodiments, same parts will be given the same names and reference symbols, and repetitive description of which will be omitted.

Figure 3:
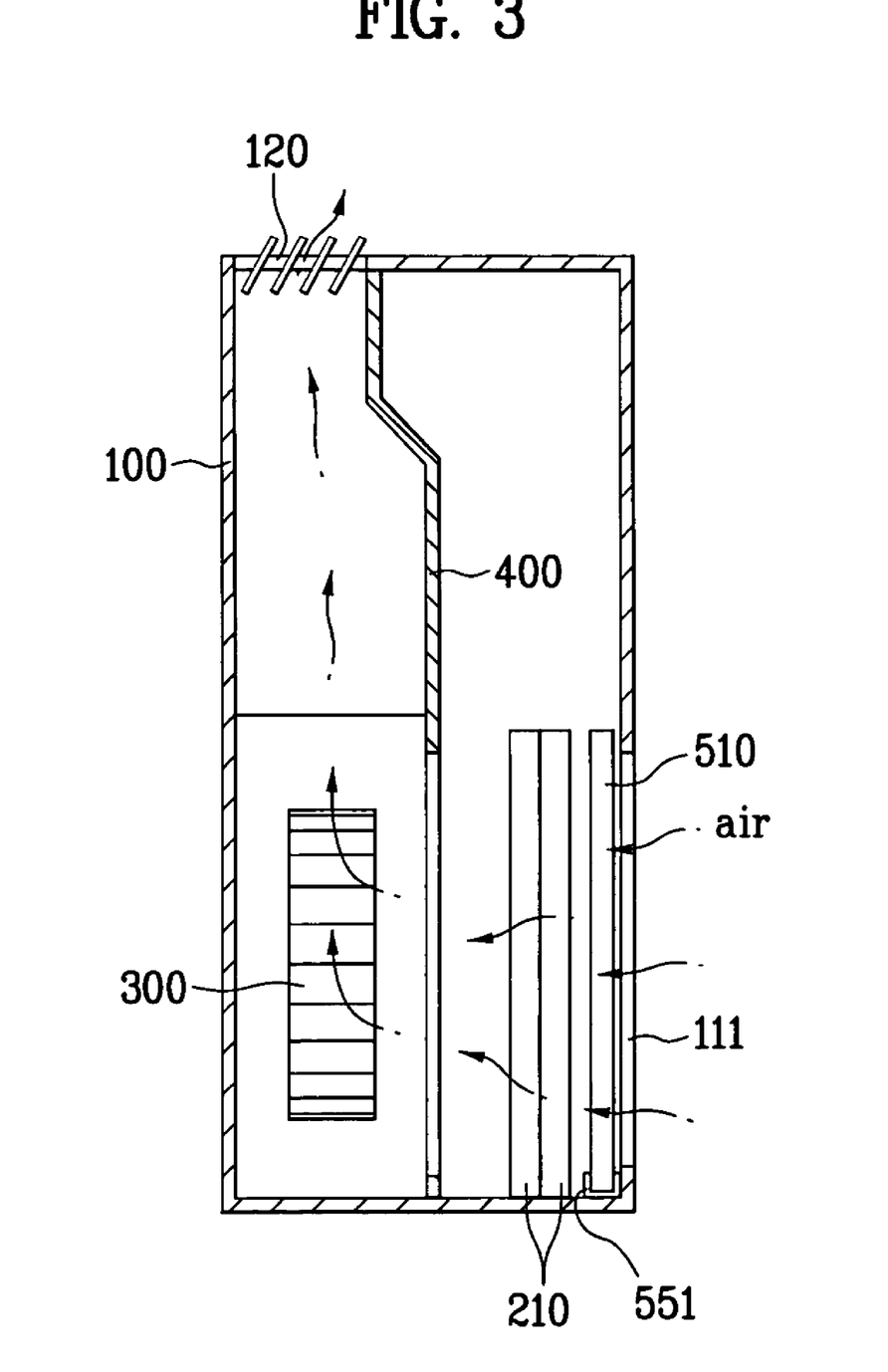
FIG. 3 illustrates a side section showing a part a first inlet of an air cleaner in accordance with a first preferred embodiment of the present invention formed therein, schematically.
Figure 4:
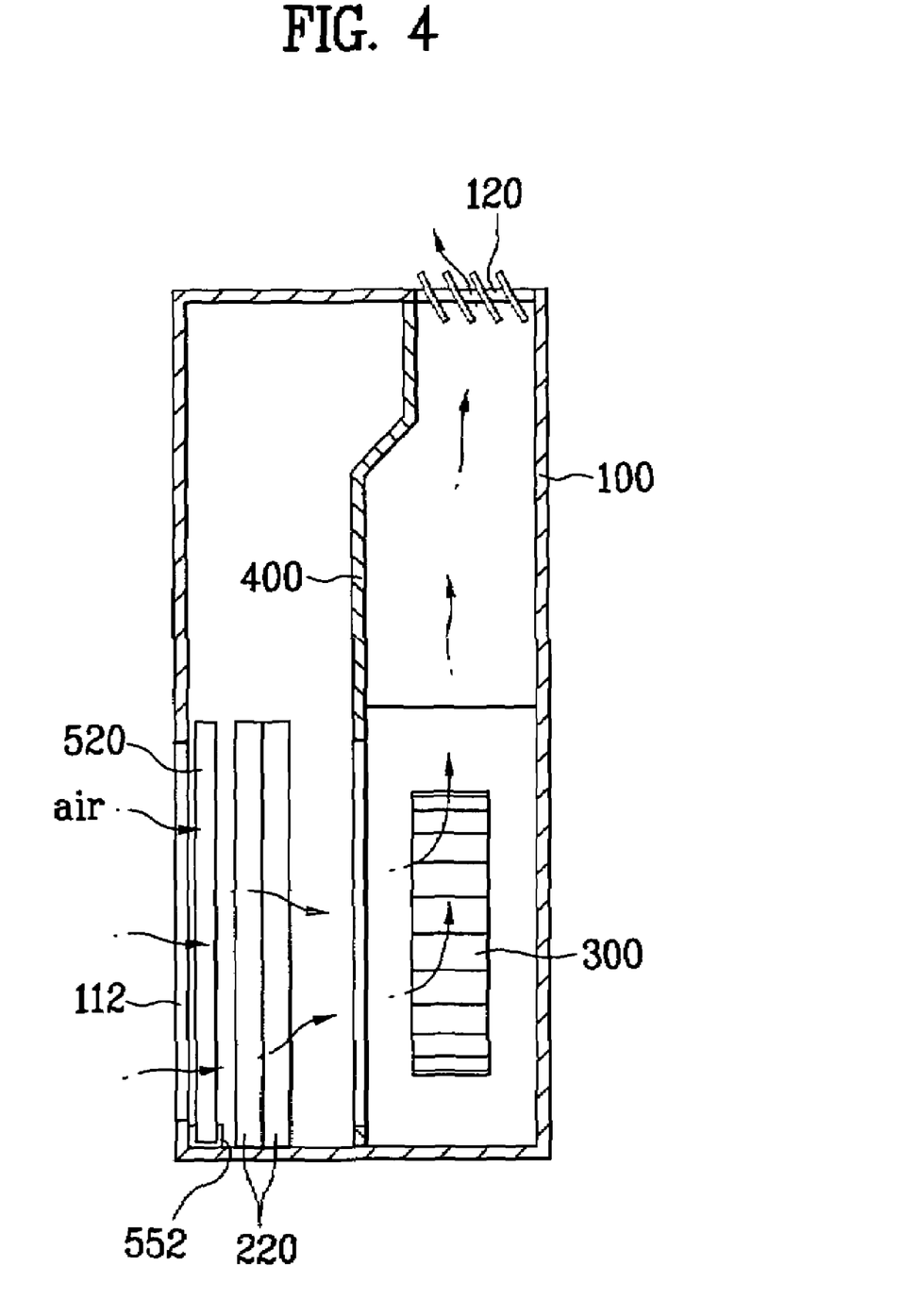
FIG. 4 illustrates a side section showing a part a second inlet of an air cleaner in accordance with a first preferred embodiment of the present invention formed therein, schematically.

FIG. 3 illustrates a side section showing a part a first inlet of an air cleaner in accordance with a first preferred embodiment of the present invention formed therein, schematically.

Referring to FIG. 3, the air cleaner includes a body 100, dust collecting filters 210, deodorizing filters 220, a discharge fan 300, and opening/closing means.

The body 100 includes a first inlet 111 and a second inlet 112 both for drawing room air, and an outlet 120 for discharging air having dust collected, or deodorized therefrom. The first inlet 111 is formed in one side of a front part of the body 100, the second inlet 112 is formed in the other side of the front part of the body 100, and the outlet in a top of the body 100.

At least one dust collecting filter 210 is mounted in the body 100 in rear of the first inlet 111 for removing various dusts from the air, and the deodorizing filters 220 are mounted in the body 100 in rear of the second inlet 112.

That is, the first inlet 110 and the second inlet 112 are formed in parallel to each other, and in correspondence to which the dust collecting filters 210 and the deodorizing filters 220 are also mounted in parallel to each other.

The discharge fan 300 is mounted in rear of the inlets 111 and 112 in the body, for drawing room air through the inlets 111 and 112. The discharge fan 300 has a flow guide on an outer circumference thereof, for guiding the air drawn into the discharge fan 300 to be discharged through the outlet 120 in the top of the body 100.

The opening/closing means, operative to open/close the inlets 111 and 112 respectively, includes a first door part 510, a second door part 520, a first driving part, and a second driving part. The first door part 510 is mounted to open/close the first inlet 111, and the second door part 520 is mounted to open/close the second inlet 112.

The first driving part is positioned in one side of the body 100 for moving the first door part 510, and the second driving part is positioned in the other side of the body 100 for moving the second door part 520.

The first driving part includes a first driving motor 531 mounted in one side of a rear part of inside of the body 100, and a first connection wire 532, and the second driving part includes a second driving motor 541 mounted in the other side of the rear part of inside of the body 100, and a second connection wire 542.

Ends of the first connection wire 532 are connected to the first driving motor 531 and the first door part 510 respectively, for moving the first door part 510 as the first connection wire 532 is wound/unwound by the first driving motor 531. Ends of the second connection wire 542 are connected to the second driving motor 541 and the second door part 520 respectively, for moving the second door part 520 as the second connection wire 542 is wound/unwound by the second driving motor 541.

Moreover, the air filter further includes a first guide rail 551 and a second guide rail 552 in the body 100 for guiding moving paths of the first door part 510 and the second door part.

The first guide rail 551 is formed for guiding a moving path of the first door part 510 from a front part of inside of the body 100 having the first inlet 111 formed therein to one side of a rear part of inside of the body 100 having the first driving motor 531 mounted therein. The second guide rail 552 is formed for guiding a moving path of the second door part 520 from a front part of inside of the body 100 the second inlet 112 is formed therein to the other side of the rear part of inside of the body 100 the second driving motor 541 is mounted therein.

The guide rails 551 and 552 may be formed to guide a bottom or a top of the door parts 510 and 520 respectively, or to guide both the bottom and the top of the door parts 510 and 520 respectively.

As shown, since the guide rail 551 or 552 is formed in an "L" along an edge of a space inside of the body 100, the door parts 510 and 520 have a flexible material able to bend as the door parts 510 and 520 move following the guide rails 551 and 552, respectively. HHHH.

Moreover, since the door part 510 or 520 includes a plurality of plates each having a small width, and a bendable part between adjacent plates, in overall, the door parts 510 and 520 can move following the guide rails 551 and 552, respectively.

The operation of the first embodiment of the present invention will be described with reference to FIGS. 5 to 8.

Figure 5:
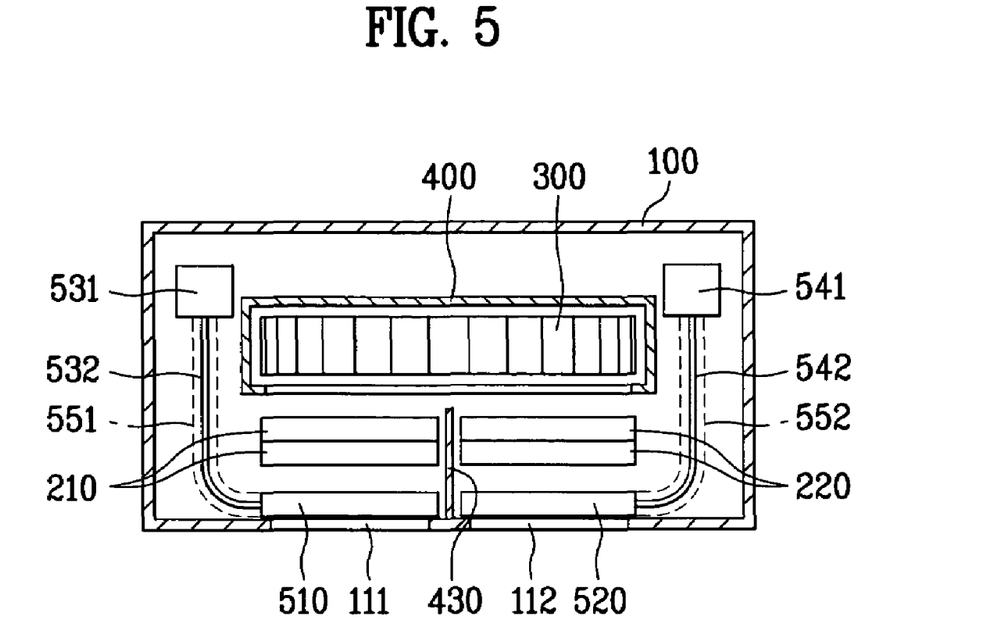
FIG. 5 illustrates a plan view showing a state an air cleaner in accordance with a first preferred embodiment of the present invention is inoperative.

Referring to FIG. 5, when the air cleaner is not in operation, the first inlet is closed with the first door part 510, and the second inlet 112 is closed with the second door part 520. In this instance, the room air gives no influence to the dust collecting filters 210 and the deodorizing filters 220 as the door parts 510 and 520 are closed.

If the air cleaner is used for collecting dust in the room air from above state, (i.e., if the user selects a dust collecting mode), the first driving motor 531 comes into operation to wind the first connection wire 532.

Figure 6:
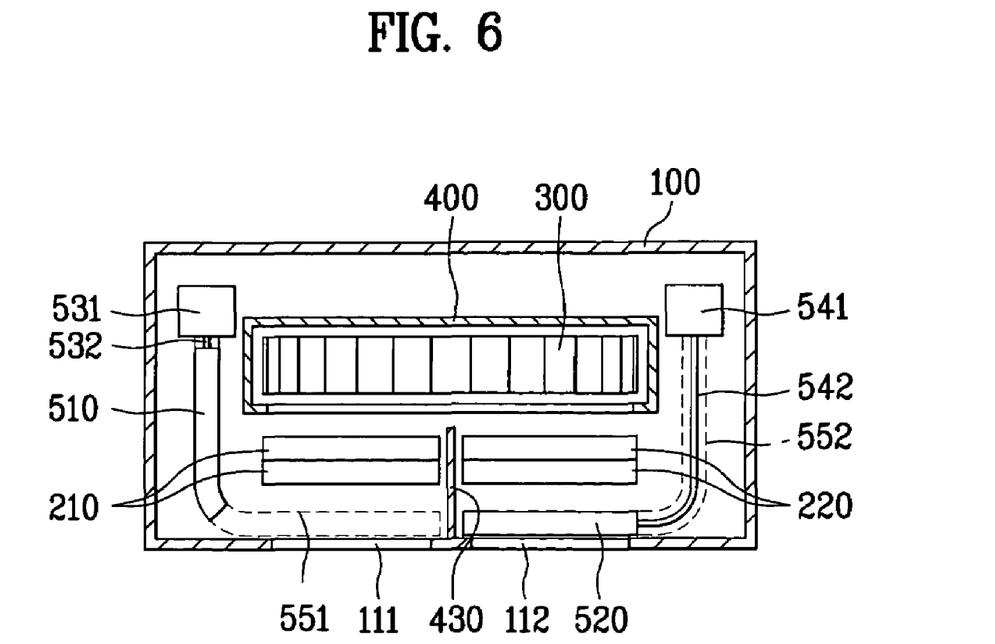
FIG. 6 illustrates a plan view showing a state an air cleaner in accordance with a first preferred embodiment of the present invention is operative for dust collection.

In this instance, as shown in FIG. 6, since the first connection wire 532 is connected to the first door part 510, the first door part 510 moves following a winding direction of the first connection wire 532 guided by the first guide rail 551. Accordingly, only the first inlet 111 for the dust collecting filter 210 are opened, but the second inlet 112 for the deodorizing filters 220 maintains a closed state.

Since the first door part 510 has a flexible material, the first door part 510 can move following the part bent in the "L" form at a corner part of inside of the body 100 during the first door part 510 moves guided by the first guide rail 551.

The operation of the air cleaner in dust collecting mode will be described with reference to FIG. 6.

Room air is drawn into the body 100 through the opened first inlet 111 by a suction force generated as the discharge fan 300 rotates. The room air is introduced into the body 100 only through the first inlet 111, and involved in removal of various dust as the room air passes through the dust collecting filters 210. The air having the dust and the like removed therefrom rises along the flow guide 400 to an upper part of the body 100, and is discharged through the outlet 120 as the discharge fan 300 operates.

Figure 7:
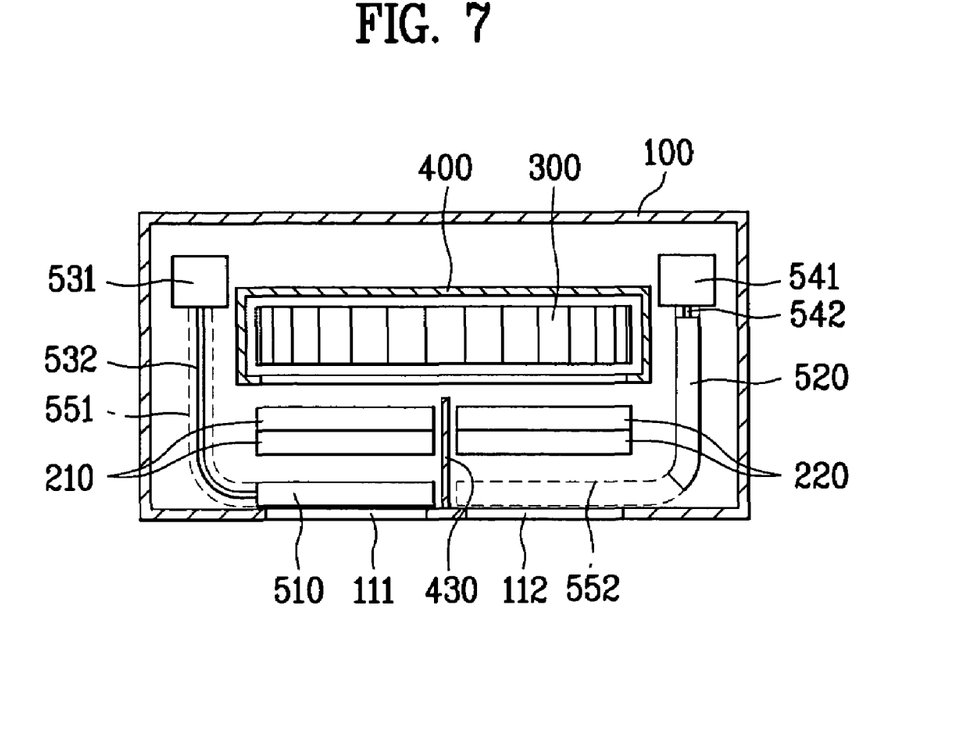
FIG. 7 illustrates a plan view showing a state an air cleaner in accordance with a first preferred embodiment of the present invention is operative for deodorization.

In the meantime, if the air cleaner is used for deodorizing smells in the room air (i.e., if the user selects a deodorizing mode), the second driving motor 541 comes into operation, to wind the second connection wire 542.

Referring to FIG. 7, since one end of the second connection wire 542 is connected to the second door part 520, the second door part 520 moves guided by the second guide rail 520 following a direction of winding of the second connection wire 542. Therefore, only the second inlet 112 for the deodorizing filters 220 are opened, but the first inlet 111 for the dust collecting filters 210 maintains a closed state.

In this instance, since the second door part 520 has a flexible material, the second door part 520 can move following the part bent in the "L" form at a corner of an inside of the body 100 during the second door part 520 moves guided by the second guide rail 552.

The operation of the air cleaner in the deodorizing mode will be described with reference to FIG. 7.

A suction force generated by operating the discharge fan 300 draws the room air into the body 100 through the opened second suction 112. Therefore, the room air is introduced into the inside of the body 100 only through the second inlet 112, to remove various odors as the room air passes through the deodorizing filters 220.

The air having the odors removed therefrom rises to the upper part of the inside of the body 100 along the flow guide 400, and discharged to the room through the outlet 120.

Thus, by operating the air cleaner only in the dust collecting mode or in the deodorizing mode depending on an environment of the site the air cleaner is installed, an efficiency of the apparatus can be enhanced.

That is, no air pass through the deodorizing filters 220 is required in the dust collecting mode, and no air pass through the dust collecting filters 220 is required in the deodorizing mode. Therefore, the deodorizing filters 220 and the dust collecting filters 210 are provided separate from, and parallel to, each other in the air cleaner. It is preferable that a baffle plate 600 is provided between the deodorizing filters 220 and the dust collecting filters 210 for preventing the air passing through filters 210 and 220 of different purposes from mixing.

Figure 8:
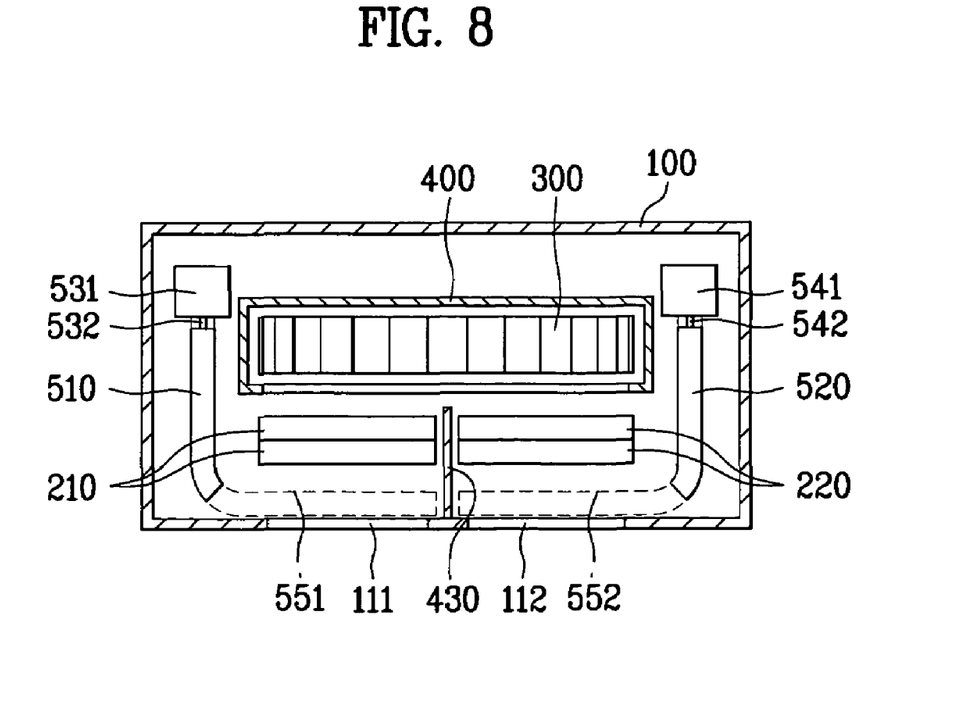
FIG. 8 illustrates a plan view showing a state an air cleaner in accordance with a first preferred embodiment of the present invention is operative both for dust collection and deodorization.

In the meantime, if the air cleaner is used for carrying out dust collection and deodorizing of the room air at the same time, both the first driving motor 531 and the second driving motor 541 come into operation at the same time, to wind the first connection wire 532 and the second connection wire 542.

Referring to FIG. 8, since the first connection wire 532 is connected to the first door part 510, the first door part 510 moves following the first guide rail 551, and, since the second connection wire 542 is connected to the second door part 520, the second door part 520 moves following the second guide rail 552.

Accordingly, both the first inlet 111 for the dust collecting filters 210 and the second inlet for the deodorizing filters 220 are opened.

The room air drawn into the inside of the body passes through, and has various dust removed therefrom, at the dust collecting filters 210, and passes through, and has various odors removed therefrom at the deodorizing filters 220. The dust collected and deodorized air rises up to the upper part of the body along the flow guide 400, and is discharged into the room again through the outlet 120 as the discharge fan 300 is driven.

In this instance, it is preferable that the discharge fan 300 is a centrifugal fan that draws air from a center part and discharges the air in a circumferential direction. The centrifugal fan has advantages of low noise, and high efficiency in comparison to a general blowing fan, and permits an optimal use of an inside space of the fan. Therefore, the flow guide 400 around the discharge fan 300 is provided in a form in conformity with a circumferential surface of the discharge fan 300, and the air discharged in the circumferential direction by the discharge fan 300 is discharged to room through the outlet 120 guided by the flow guide 400.

In the meantime, the inlets 111 and 112 can not be formed only in the front part of the body 100 like the first embodiment of the present invention.

Figure 9:
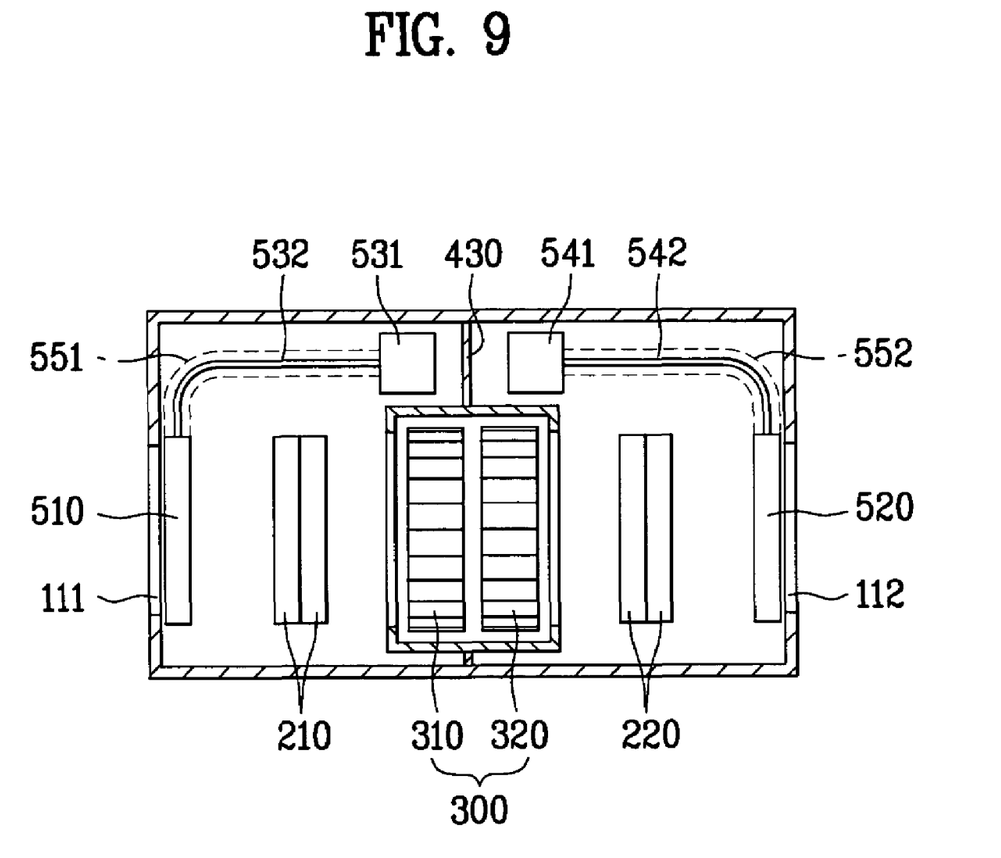
FIG. 9 illustrates a plan view of an air cleaner in accordance with a second preferred embodiment of the present invention, schematically.

Referring to FIG. 9, in a second embodiment of the present invention, the inlets are formed in opposite sides of the body 100. Therefore, the discharge fan 300 is mounted in a central part of the inlets 111 and 112 substantially, to draw the room air through the inlets 111 and 112. If the discharge fan is of a centrifugal type, since it is required to draw air from both sides, one pair of fans, such as a first discharge fan 310 and a second discharge fan 320 having different directions of suction are required. In this instance, the opening/closing means for opening/closing the inlets 111 and 112 can be provided identical to the first embodiment at different positions.

In the second embodiment too, a baffle plate 430 is provided for separating a space for dust collecting filters 210 and a space for deodorizing filters 220.

Moreover, though not shown, the inlets 111 and 112 may be formed in the front part and rear part of the body 100 respectively, with a structure the same with the first or second embodiment.

In the meantime, the third embodiment of the present invention has a structure in which the door parts of the opening/closing means are integrated.

Figure 10:
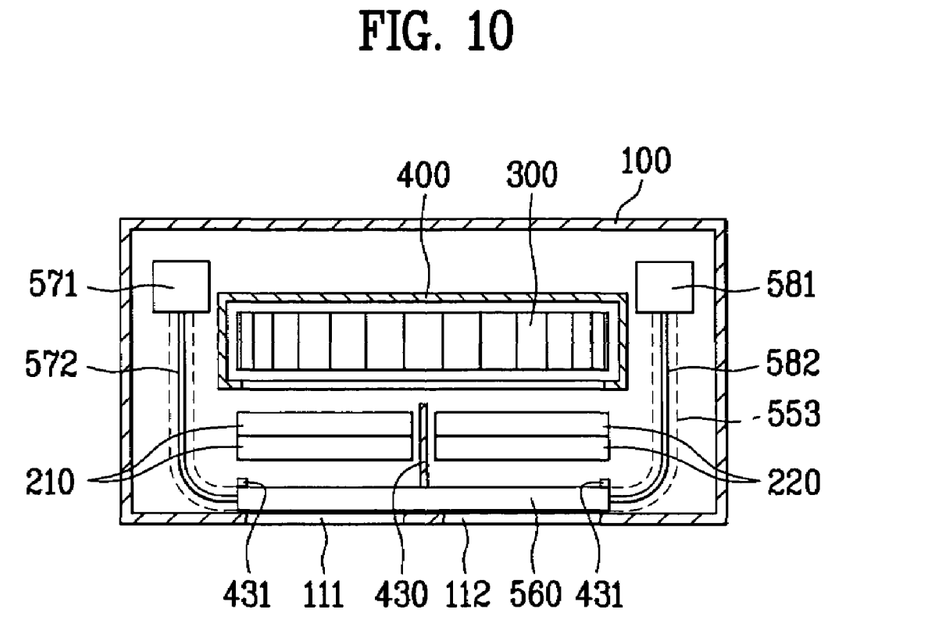
FIGS. 10~12 illustrate plan views each showing operation of an air cleaner in accordance with a third preferred embodiment of the present invention, schematically.

Referring to FIG. 10, the first inlet 111 and the second inlet 112 are formed in opposite sides of the front part of the body 100, and one third door part 560 can open/close the inlets 111 and 112 selectively.

That is, the third door part 560 is formed long enough to open/close the first inlet 111 and the second inlet 112 at the same time, and is movable in both directions inside of the body 100 with a third driving part.

The third driving part includes a third connection wire 572 having one end connected to one end of the third door part 560, a third driving motor 571 to be driven for winding/unwinding the third connection wire 572, a fourth connection wire 582 having one end connected to the other side of the third door part 560, and a fourth driving motor 581 to be driven for winding/unwinding the fourth connection wire 582.

There is a third guide rail 553 for guiding movement of the third door part 560 following an edge of an inside of the body 100.

The operation of the air cleaner in accordance with a third preferred embodiment of the present invention will be described, with reference to FIGS. 10~12.

Referring to FIG. 10, in an initial state, the third door part 560 is at a position to close both the first inlet 111 and the second inlet 112.

When the user selects a dust collecting mode in the initial state, the third driving motor 571 is driven to unwind the third connection wire 572, and the fourth driving motor 581 is driven to wind the fourth connection wire 582.

Figure 11:
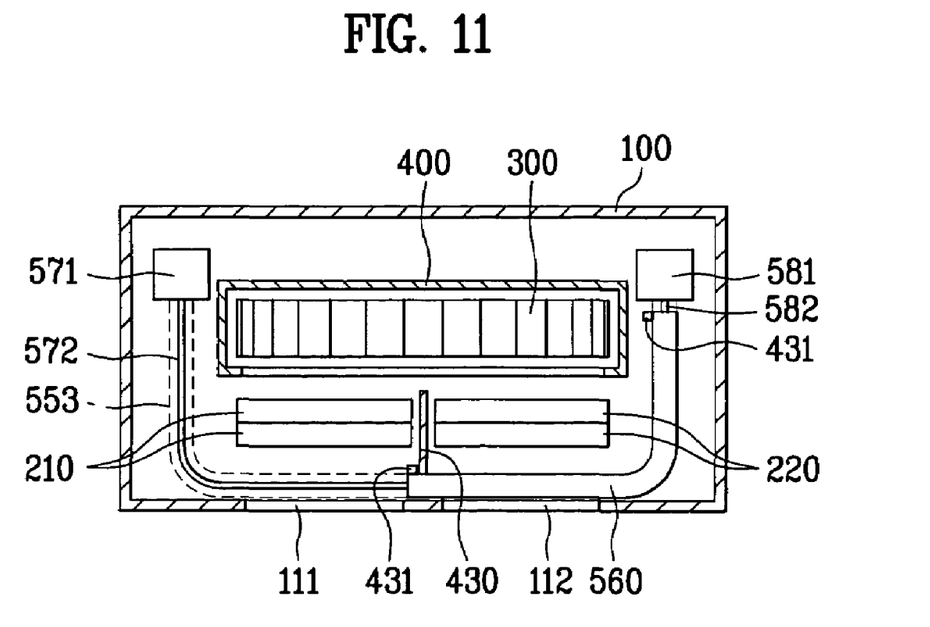

Referring to FIG. 11, the third door part 560 moves in a direction the second inlet 112 is positioned to open the first inlet 111, and when the third door part 560 arrives to a position the first inlet 111 is opened fully, operation of the third driving motor 571 and the fourth driving motor 581 are stopped. Thereafter, the discharge fan 300 comes into operation, to introduce room air into the body 100 through the opened first inlet 111, to remove dust from the air as the air passes through the dust collecting filters 210.

In the meantime, if the user selects the deodorizing mode in the initial state, the third driving motor 560 is driven to wind the third connection wire 572, and the fourth driving motor 581 is driven to unwind the fourth connection wire 582.

Figure 12:
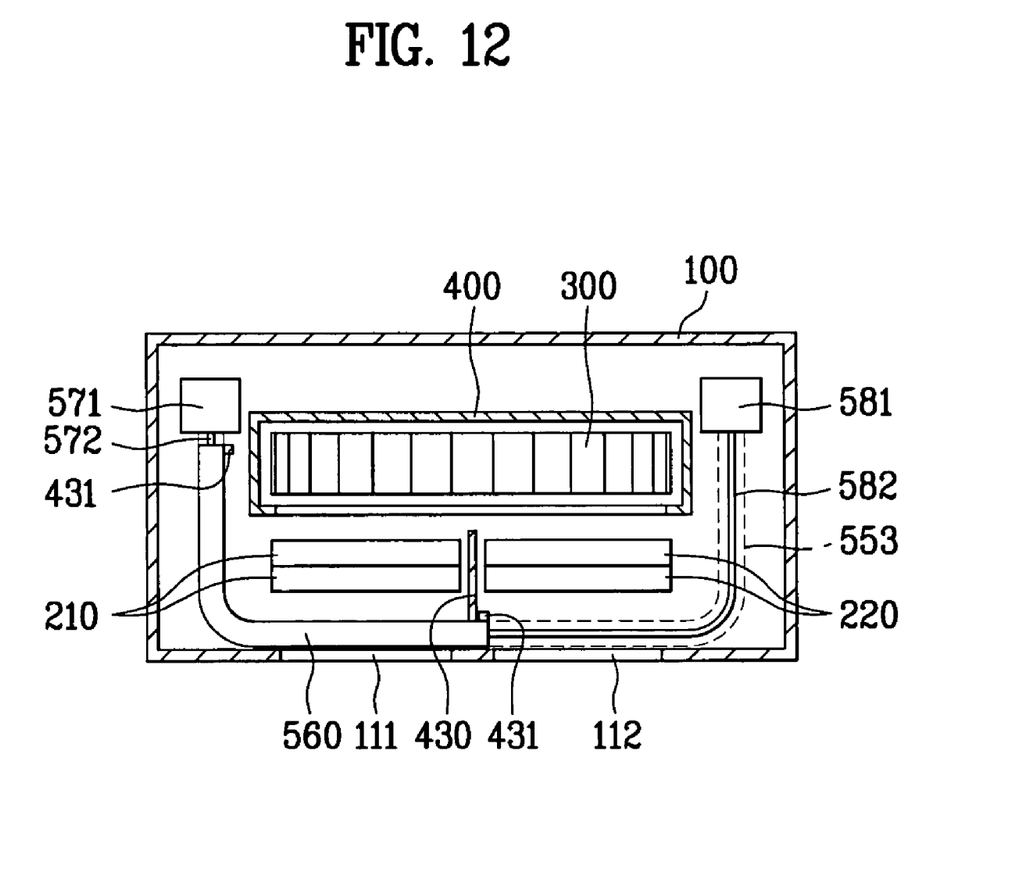

Referring to FIG. 12, the third door part 560 moves in a direction the third inlet 111 is positioned, to open the second inlet 112, and when the third door part 560 arrives to a position at which the third door part 560 opens the second inlet 112 fully, operation of the third driving motor 571 and the fourth driving motor 581 is stopped. Thereafter, as the discharge fan 300 is operated, the room air is introduced into the body 100 through the opened second inlet 112, and has odors removed therefrom as the room air passes through the deodorizing filters 220.

In the third embodiment too, the baffle plate 430 for separating a space for the dust filters 210 and a space of the deodorizing filters 220 are provided.

Moreover, it is preferable that the third door part 560 has pins 431 at both ends to be fastened to the baffle plate 430. For fastening the third door part 560 at an exact position in cases the mode changes from the dust collecting mode to the deodorizing mode, or vice versa, the pins 431 are formed at a preset position inside of the third door part 560.

Figure 13:
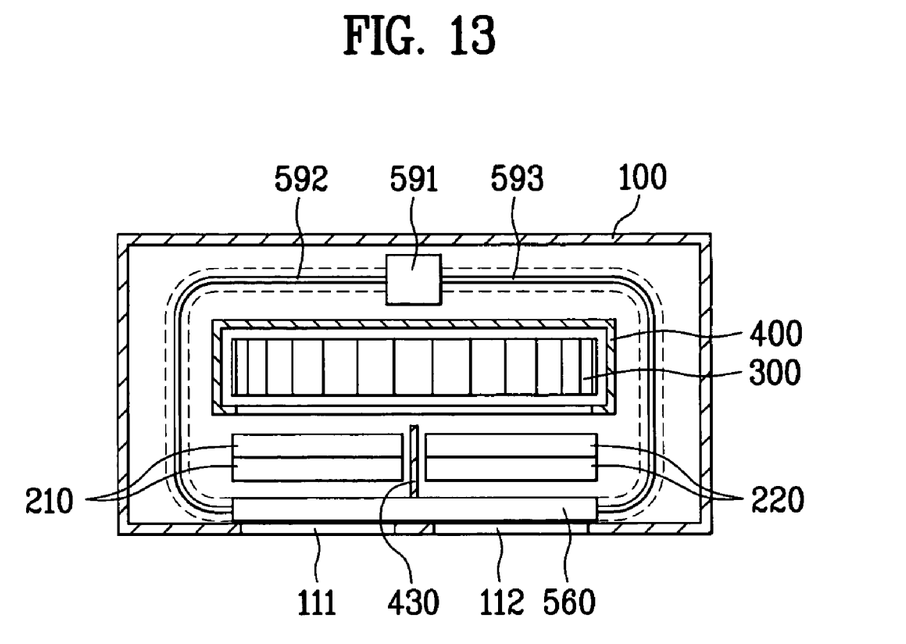
FIGS. 13~15 illustrate plan views each showing operation of an air cleaner in accordance with a fourth preferred embodiment of the present invention, schematically.
Figure 14:
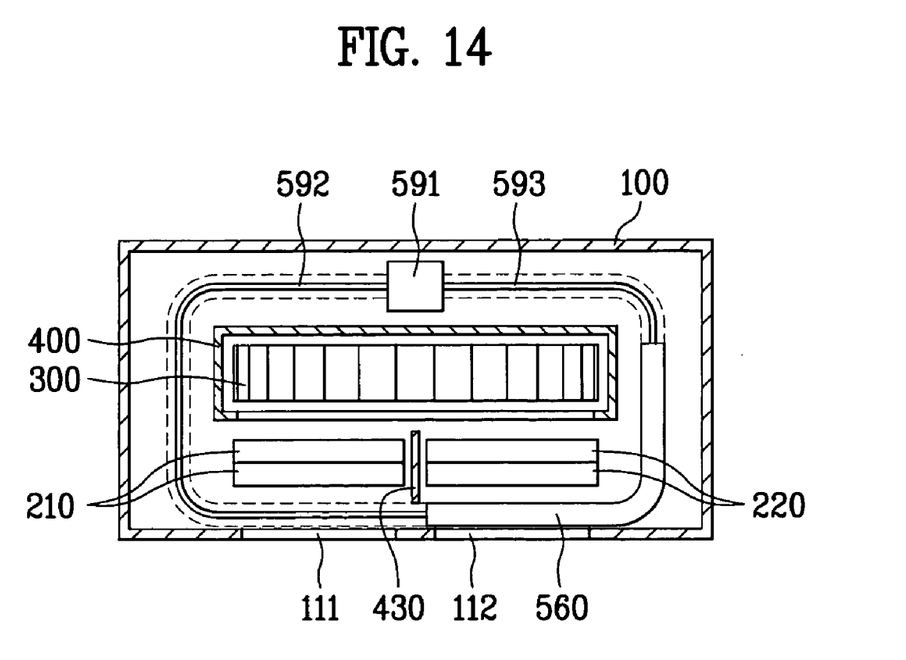
Figure 15:
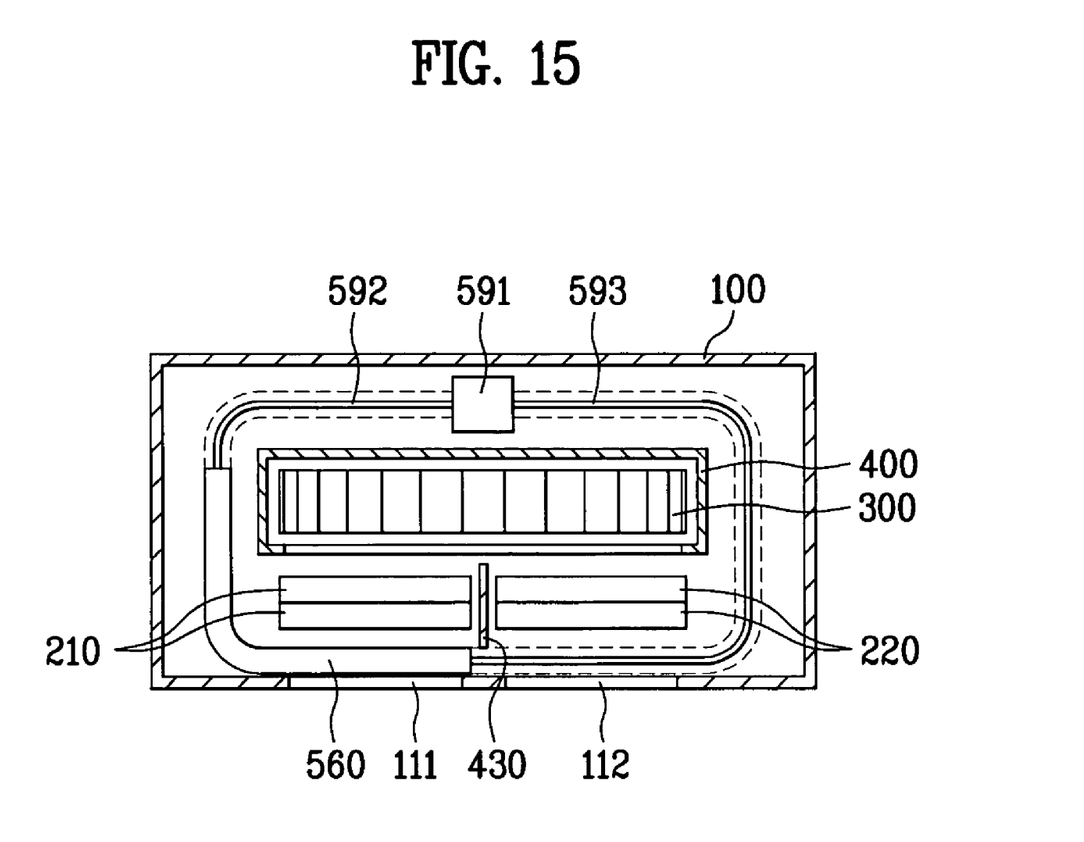

FIGS. 13~15 illustrate systems in accordance with a fourth preferred embodiment of the present invention.

Different from the third embodiment, in the fourth embodiment of the present invention, the third driving part 560 of the opening/closing means includes only one driving motor (fifth driving motor) 591 and one pair of connection wire (a fifth connection wire and a sixth connection wire) 592, and 593.

The fifth driving motor 591 is a dual-axis motor. The fifth connection wire 592 has one end connected to one side of the third door part 560, and the other side connected to the fifth driving motor 591. The sixth connection wire 593 has one end connected to the other side of the third door part 560, and the other end connected to the fifth driving motor 591.

Referring to FIG. 14, if the air cleaner is used for dust collection, the fifth driving motor 591 is driven to unwind the fifth wire 592 and wind the sixth connection wire 593 in the initial state (FIG. 13), to move the third door part 560 in a direction the second inlet 112 is positioned. Therefore, the room air is drawn into the body 100 only through the opened first inlet 111, and has various dusts therein removed with the dust collecting filters 210 at the first inlet 111.

Referring to FIG. 15, if the air cleaner is used for deodorizing, the fifth driving motor 591 is driven to wind the fifth connection wire 592 and to unwind the sixth connection wire 593, to move the third door part 560 in a direction the first inlet 111 is positioned. Therefore, the room air is drawn into the body 100 only through the opened second inlet 112, and has the various smell compositions in the room air removed at the deodorizing filters 220 at the second inlet 112.

Moreover, in the fourth embodiment too, a baffle plate 430 is provided for separating a space for the dust collecting filters 210 and a space for the deodorizing filters 220.

As has been described, the air cleaner of the present invention has an advantage in that reduction of lifetimes of the filters can be prevented by passing room air only to the filters required depending on purpose of use or environment.

Moreover, since a number of the filters the room air required to pass is reduced, a load on the discharge fan that provides the suction force can be reduced. That is, in comparison to the related art air cleaner, in a case the discharge fan is driven at the same condition (the same speed), a flow rate of the air of the air cleaner of the present invention is significantly higher than the flow rate of the air of the related art air cleaner.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An air cleaner comprising:
    a body forming an exterior, including a first inlet and a second inlet for drawing room air, and an outlet for discharging air having dust or odor removed therefrom;
    at least one dust collecting filter at the first inlet inside of the body;
    at least one deodorizing filter at the second inlet inside of the body;
    at least one discharge fan for providing a suction force so as to draw room air, pass the room air through the filters inside of the body, and discharge the room air through the outlet;
    opening/closing means for opening/closing the inlets, selectively; and
    a baffle plate positioned between the at least one dust collecting filter and the at least one deodorizing filter in order to separate a space for the at least one dust collecting filter from a space for the at least one deodorizing filter.

2. The air cleaner as claimed in claim 1, wherein the inlets are formed in parallel in a front part of the body.

3. The air cleaner as claimed in claim 1, wherein the discharge fan is a centrifugal fan.

4. The air cleaner as claimed in claim 1, wherein the inlets are formed in opposite sides of the body.

5. The air cleaner as claimed in claim 4, wherein the at least one discharge fan includes one pair of centrifugal fans arranged in parallel in a central part of the inlets, respectively.

6. The air cleaner as claimed in claim 1, wherein the inlets are formed in the front part and a rear part of the body, respectively.

7. The air cleaner as claimed in claim 6, wherein the at least one discharge fan includes one pair of centrifugal fans arranged in parallel in a central part of the inlets, respectively.

8. The air cleaner as claimed in claim 1, wherein the opening/closing means includes:
    a first door part for opening/closing the first inlet;
    a second door part for opening/closing the second inlet; and
    a first driving part and a second driving part for driving respective door parts.

9. The air cleaner as claimed in claim 8, wherein the first driving part includes a first driving motor, and a first connection wire connected between the first driving motor and the first door part, and the second driving part includes a second driving motor, and a second connection wire connected between the second driving motor and the second door part.

10. The air cleaner as claimed in claim 8, wherein the opening/closing means further includes a first guide rail and a second guide rail.

11. The air cleaner as claimed in claim 10, wherein the first guide rail is bent along an edge of an inside of the body so as to guide the first door part to positions at which the first inlet is closed or opened, and the second guide rail is bent along an edge of an inside of the body so as to guide the second door part to positions at which the second inlet is closed or opened.

12. The air cleaner as claimed in claim 10, wherein the guide rails guide tops or bottoms of the door parts, respectively.

13. The air cleaner as claimed in claim 10, wherein the guide rails guide tops and bottoms of the door parts, respectively.

14. The air cleaner as claimed in claim 8, wherein the door parts are formed of materials, including a flexibly bendable material.

15. The air cleaner as claimed in claim 8, wherein the door part includes:
    a plurality of plates each having a small width; and
    a flexibly bendable bending part between the plates.

16. The air cleaner as claimed in claim 1, wherein the opening/closing means includes:
    a third door part movable to close at least any one of the inlets selectively; and
    a third driving part for moving the third door part in both directions.

17. The air cleaner as claimed in claim 16, wherein the third driving part includes:
    a third connection wire having one end connected to one side of the third door part;
    a third driving motor to be driven to wind or unwind the third connection wire;
    a fourth connection wire having one end connected to the other side of the third door part; and
    a fourth driving motor to be driven to wind or unwind the fourth connection wire.

18. The air cleaner as claimed in claim 17, further comprising a baffle plate between the at least one dust collecting filter and the at least one deodorizing filter, and pins at both ends of the third door parts to be fastened to the baffle plate.

19. The air cleaner as claimed in claim 16, wherein the third driving part includes:
    a fifth connection wire having one end connected to one side of the third door part;
    a sixth connection wire having one end connected to the other side of the third connection part; and
    a fifth driving motor connected to the other ends of the fifth connection wire and the sixth connection wire to be driven to wind/unwind respective connection wires.

20. An air cleaner comprising:
    a body forming an exterior, including a first inlet and a second inlet for drawing room air, and an outlet for discharging air having dust or odor removed therefrom;
    at least one dust collecting filter at the first inlet inside of the body;
    at least one deodorizing filter at the second inlet inside of the body;
    at least one discharge fan for providing a suction force so as to draw room air, pass the room air through the filters inside of the body, and discharge the room air through the outlet; and
    opening/closing means for opening/closing the inlets, selectively,
    wherein the inlets are formed in parallel in a front part of the body.

21. An air cleaner comprising:
a body forming an exterior, including a first inlet and a second inlet for drawing room air, and an outlet for discharging air having dust or odor removed therefrom;
at least one dust collecting filter at the first inlet inside of the body;
at least one deodorizing filter at the second inlet inside of the body;
at least one discharge fan for providing a suction force so as to draw room air, pass the room air through the filters inside of the body, and discharge the room air through the outlet; and
opening/closing means for opening/closing the inlets, selectively,
wherein the opening/closing means includes:
 a first door part for opening/closing the first inlet;
 a second door part for opening/closing the second inlet; and
 a first driving part and a second driving part for driving respective door parts.

22. An air cleaner comprising:
a body forming an exterior, including a first inlet and a second inlet for drawing room air, and an outlet for discharging air having dust or odor removed therefrom;
at least one dust collecting filter at the first inlet inside of the body;
at least one deodorizing filter at the second inlet inside of the body;
at least one discharge fan for providing a suction force so as to draw room air, pass the room air through the filters inside of the body, and discharge the room air through the outlet; and
opening/closing means for opening/closing the inlets, selectively,
wherein the opening/closing means includes:
 a third door part movable to close at least any one of the inlets selectively; and
 a third driving part for moving the third door part in both directions; and
wherein the third driving part includes:
 a third connection wire having one end connected to one side of the third door part;
 a third driving motor to be driven to wind or unwind the third connection wire;
 a fourth connection wire having one end connected to the other side of the third door part; and
 a fourth driving motor to be driven to wind or unwind the fourth connection wire.

23. An air cleaner comprising:
a body forming an exterior, including a first inlet and a second inlet for drawing room air, and an outlet for discharging air having dust or odor removed therefrom;
at least one dust collecting filter at the first inlet inside of the body;
at least one deodorizing filter at the second inlet inside of the body;
at least one discharge fan for providing a suction force so as to draw room air, pass the room air through the filters inside of the body, and
discharge the room air through the outlet; and
opening/closing means for opening/closing the inlets, selectively,
wherein the opening/closing means includes:
 a third door part movable to close at least any one of the inlets selectively; and
 a third driving part for moving the third door part in both directions; and
wherein the third driving part includes:
 a fifth connection wire having one end connected to one side of the third door part;
 a sixth connection wire having one end connected to the other side of the third connection part; and
 a fifth driving motor connected to the other ends of the fifth connection wire and the sixth connection wire to be driven to wind/unwind respective connection wires.

* * * * *